(12) United States Patent
Small

(10) Patent No.: US 8,550,102 B2
(45) Date of Patent: Oct. 8, 2013

(54) EASILY REPLACEABLE VALVE ASSEMBLY FOR A HIGH PRESSURE PUMP

(75) Inventor: Tony M. Small, Fort Worth, TX (US)

(73) Assignee: FTS International Services, LLC, Fort Worth, TX (US)

( * ) Notice: Subject to any disclaimer, the term of this patent is extended or adjusted under 35 U.S.C. 154(b) by 267 days.

(21) Appl. No.: 13/010,873

(22) Filed: Jan. 21, 2011

(65) Prior Publication Data

US 2012/0187321 A1 Jul. 26, 2012

(51) Int. Cl.
*F16K 15/06* (2006.01)

(52) U.S. Cl.
USPC .................. 137/15.18; 137/315.13; 137/454.5

(58) Field of Classification Search
USPC ..................... 137/315.11, 543.13, 542, 454.4, 137/454.5, 543, 15.18, 315.13; 417/454, 417/455, 453; 251/321–323, 360–362
See application file for complete search history.

(56) References Cited

U.S. PATENT DOCUMENTS

| 2,882,925 | A | * | 4/1959 | Smolensky | .................... 137/542 |
| 4,205,702 | A | * | 6/1980 | Silverwater | .................... 137/557 |
| 4,467,703 | A | | 8/1984 | Redwine et al. | |
| 4,527,961 | A | | 7/1985 | Redwine et al. | |
| 5,073,096 | A | | 12/1991 | King et al. | |
| 5,636,975 | A | | 6/1997 | Tiffany et al. | |
| 6,544,012 | B1 | | 4/2003 | Blume | |
| 6,623,259 | B1 | | 9/2003 | Blume | |
| 7,186,097 | B1 | | 3/2007 | Blume | |
| 7,341,435 | B2 | | 3/2008 | Vicars | |
| 7,513,759 | B1 | | 4/2009 | Blume | |
| 7,681,589 | B2 | | 3/2010 | Schwegman | |
| 2010/0288958 | A1 | | 11/2010 | Vicars | |

FOREIGN PATENT DOCUMENTS

| DE | 20320754 | 2/2005 |
| RU | 694683 | 2/2005 |

OTHER PUBLICATIONS

PCT International Search Report and Written Opinion of the International Searching Authority, pp. 1-12, dated Jun. 3, 2012.

\* cited by examiner

*Primary Examiner* — Kevin Lee
(74) *Attorney, Agent, or Firm* — Steven H. Washam; Harper Washam LLP

(57) ABSTRACT

A valve assembly for use in high pressure pumps is designed for easy replacement for example in the suction inlet here for a high pressure pump. The design utilizes a combination of screw threads and a locking member to provide structural strength for the valve to be placed in and withdrawn from the inlet bore.

17 Claims, 3 Drawing Sheets

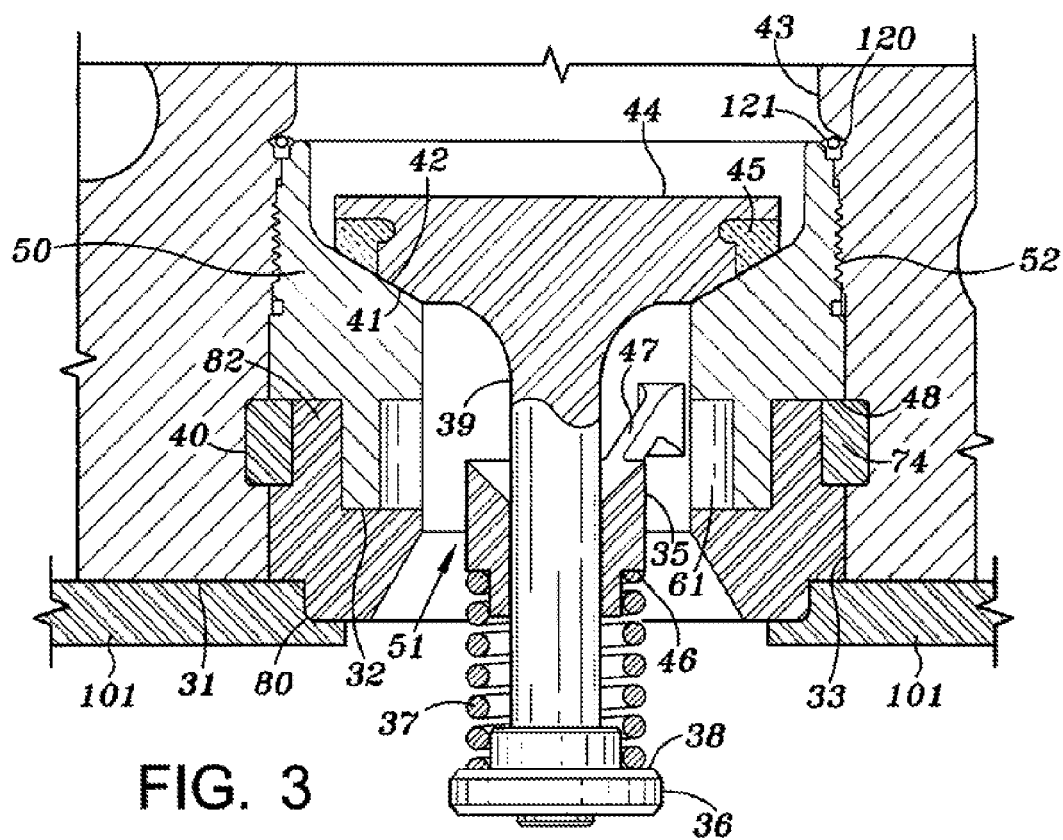
FIG. 3
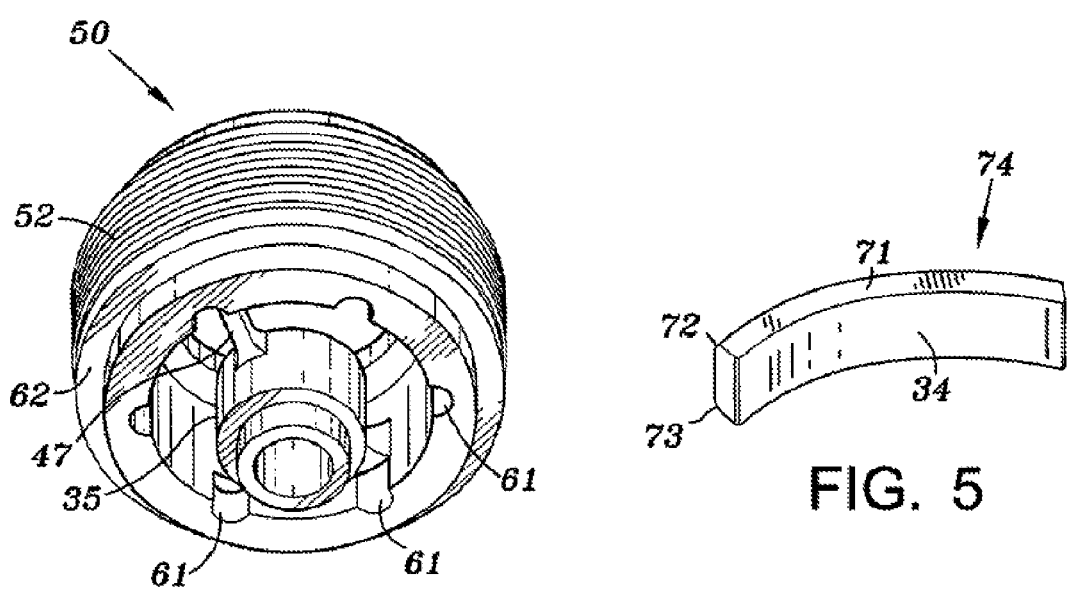
FIG. 4
FIG. 5

_US 8,550,102 B2_

EASILY REPLACEABLE VALVE ASSEMBLY FOR A HIGH PRESSURE PUMP

BACKGROUND OF INVENTION

1. Field of the Invention

This invention relates to high pressure fluid pumps and in particular to an arrangement for allowing easy access to and repair/replacement of suction valves located within the pump housing.

2. Description of Related Art

High pressure reciprocating piston pumps have been used in the oil industry for several purposes such as hydraulic fracturing, cementing, and other well treating processes. Typical pump assemblies are disclosed in U.S. Pat. No. 6,544,012 issued to Blaine. The pumps generally include a power end and a fluid end. The power end includes a power source and linkage for reciprocating a plurality of plungers within the fluid end of the pump. The fluid end includes a suction manifold, a plurality of intake or suction valves, a plurality of output valves and a discharge header. The fluid pressure within the pump chamber can be in excess of fifteen thousand psi and the fluid being pumped often contains abrasive materials such as sand. Consequently the valves are subject to extreme conditions which cause failures and require regular service and replacement. It is therefore desirable to construct the valve assembly so as to be easily accessible and replaceable in a short period of time.

Current methods for accessing the suction valves include providing a bore with a plug as shown in U.S. Pat. No. 7,681,589 at 38 and 40 in FIG. 1. Another method is disclosed by Blume in the above mentioned U.S. Pat. No. 6,544,012 that includes providing a threaded suction valve seat retainer 135. However in high pressure applications the threads on the valve seat retainer are not sufficient to withstand the force within the pump chamber.

BRIEF SUMMARY OF THE INVENTION

The present invention overcomes the above mentioned deficiencies in the prior art by providing a suction valve assembly that is modular in nature and is secured in place by using a dual locking arrangement that distributes forces delivered by the pumping system between a threaded valve seat collar and a locking ring, which includes a plurality of arcuate segments. The invention may be applied to a stem guided valve type suction valve or to a "crows feet" guide suction valve.

BRIEF DESCRIPTION OF THE SEVERAL VIEWS OF THE DRAWING(S)

FIG. 3 is a cross sectional view of a valve according to an embodiment of the invention.

FIG. 4 is a perspective view of the valve seat and stem guide shown in FIG. 3.

FIG. 5 is a perspective view of one of the segments of the locking ring.

DETAILED DESCRIPTION OF THE INVENTION

Figure 1:
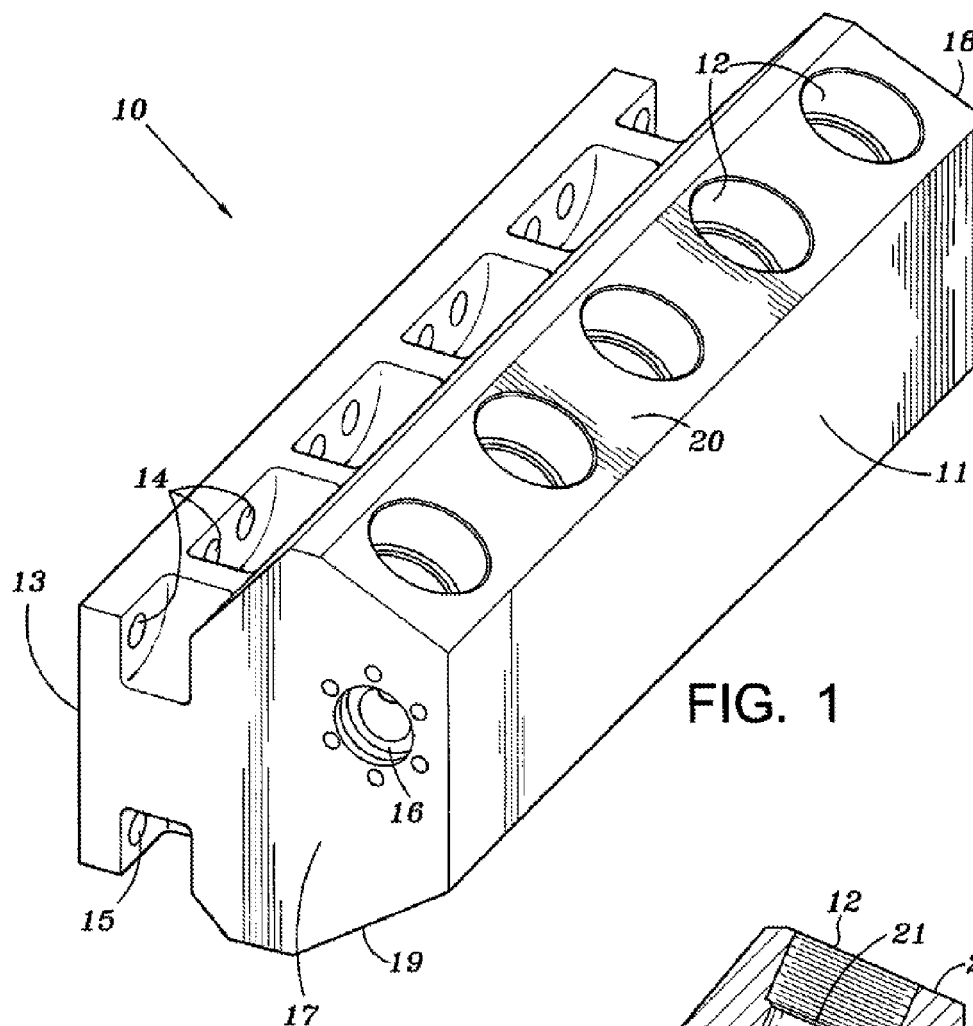
FIG. 1 is a perspective view of the fluid end of a typical high pressure pump.
Figure 2:
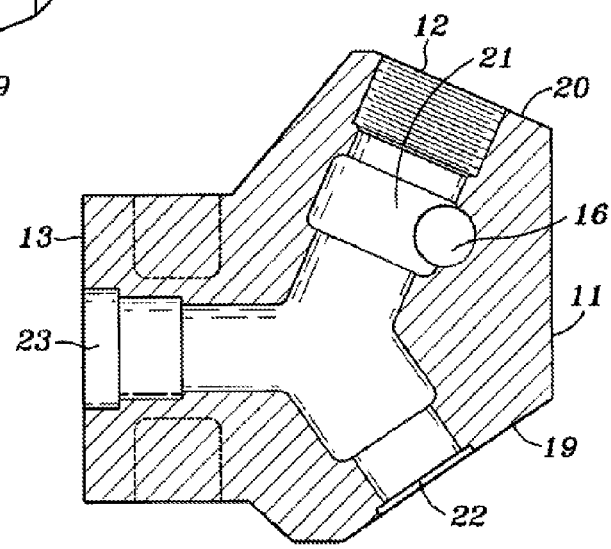
FIG. 2 is a cross sectional view taken along line 2 of FIG. 1.

FIG. 1 illustrates a conventional fluid end 10 of a high pressure pump. The fluid end includes an inclined top surface 20 having a plurality of bores 12 for receiving outlet valve mechanisms which are not shown. Fluid end 10 has a planar front side 11 and a rear side 13 that is adapted to be bolted to the power end. Suitable bores 14, 15 are provided for receiving threaded studs with nuts. A horizontally extending outlet passageway 16 is in fluid communication with each of the outlet chambers 21 of the pump as shown in FIG. 2. Fluid end 10 further includes a lower extending inclined portion 19. A plurality of inlet ports 22 are located in portion 19. Planar front side portion 11 externals vertically between inclined surfaces 20 and 19 when the pump is secured to a truck bed. The rear side 13 of the fluid end includes a plurality of bores 23 for receiving the pistons (not shown) which are driven by the power end of the pump. The arrangement of the pistons, the fluid inlet, and the fluid outlet is commonly referred to as the "Y" design for a frac pump as shown in FIG. 2. However, a "T" configuration as known in the art could also be used.

FIG. 2 illustrates the interior details of a typical pump chamber including suction inlets 22, outlet chamber 21 and outlet passageway 16. Suction valves (not shown) are located within bores 22 and outlet valves not shown) are located in bores 12. A plurality of bores 23 are adapted to receive the pump plungers which are driven by the power end of the pump.

A valve assembly according to an embodiment of the invention is illustrated in FIG. 3. The valve assembly 51 includes a threaded valve seat collar 50, a valve stem guiding member 35, a valve member 39 including a stem and an upper head 44 with a valve face 42, a valve spring 37 held in place by a spring retaining member 36 such that the valve head 44 is biased against the valve seat 41 on the collar 50. An annular ridge 32 about the collar 50 provides space for the inclusion of a plurality of locking elements 74 within an annular groove 40 formed within a suction inlet bore 33.

Valve seat collar 50 is threaded at 52 so as to be threadly received in inlet bore 33 of fluid end 31. Valve seat collar 50 includes a valve stem guiding member 35 which is supported by arms 47 that extend between the inner portion of the valve seat collar and valve stem guiding member 35, see FIG. 4. Valve seat collar 50 also includes a shoulder 48 and an annular ridge 32 that cooperates with the locking elements 74 to help secure the valve seat collar within the bore in a manner to be discussed below. A spring 37 which may be a coil spring is disposed between a shoulder 46 on the valve stem guide 35 and a shoulder 38 provided on spring retaining member 36. A locking pin not shown holds spring retaining member 36 on valve stem 39. Member 36 could also be threaded or welded to valve member 39. The spring is biased to urge upper portion 44 with insert member 45 into engagement with valve seat 41 provided on the valve seat collar 50.

Figure 6:
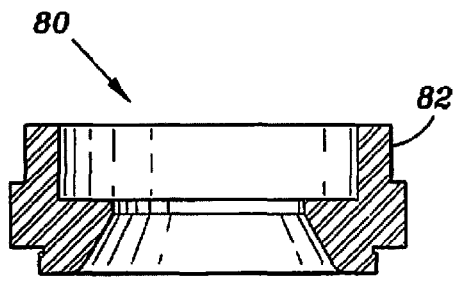
FIG. 6 is a cross sectional view of a flow diverter for the valve according to the invention.
Figure 6A:
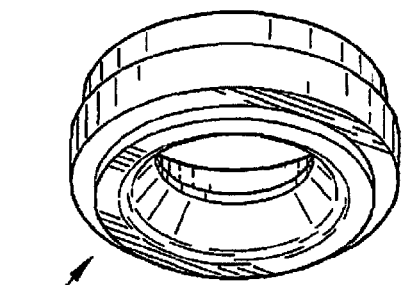

Locking elements 74 are shown in FIG. 5 and include an arcuate, generally rectangular shaped body 71 with a curved inner face 34. At its outer surface the edges of the top and bottom portions are beveled at 72 and 73 to allow the segments to more easily be located within the annular groove 40 in the bore 33 of the fluid end, thereby forming a locking ring (i.e, a ring of locking elements) when a sufficient number of locking elements 74 are placed substantially end to end within the groove 40. A flow diverter 80 as shown in FIGS. 6 and 6a is positioned within the bore 33 at its opening.

A U-shaped seal 120 which includes an O-ring 121 positioned within the U-shaped channel is positioned between valve seat collar 50 and a recess in the inlet bore as shown in FIG. 3. These seals are available from Marco Rubber & Plastic Products, Inc., among others.

The manner of installing the valve assembly into the fluid end is as follows. Initially locking elements 74 are not located within the suction inlet bore. The valve assembly including the valve seat collar 50 and the valve 39 with spring 37 and spring retainer 36 may be threaded into the suction inlet bore 33 using a suitable tool having complimentary features that align and engage with tool receiving grooves 61 provided on the valve seat collar 50, such that the valve head 44 faces the fluid head inlet chamber 43. The valve assembly is inserted and threaded into the suction inlet bore 33 to a point where the shoulder 48 of valve seat collar 50 passes the inner top portion of groove 40, thereby exposing the full dimensions of the annular groove 40 for accepting a plurality of locking elements 74. A plurality of locking elements 74, for example four locking elements 74 spaced equally around the annular groove 40 circumference, are now inserted and positioned in the annular groove 40 to form a locking ring. To retain the locking elements 74 within the annular groove 40, the valve seat collar 50 is then backed out of the bore 33 to seat the shoulder 48 against the locking elements 74 thereby imparting a compressive force on the locking elements 74 and the wall of the annular groove 40. In this position the high fluid pressure generated within the fluid end chamber during operation is withstood by both the threads 52 on the valve seat collar 50 and the locking elements 74 within annular groove 40. A flow diverter 80 as shown, for example, in FIG. 6A is then placed within the suction inlet bore 33 in the position as shown in FIG. 3 and held in place by a suction manifold plate 101 attached to the fluid end 31 by any suitable means, for example, a threaded bolt or a threaded stud and nut. An annular ridge 82 of the flow diverter helps to maintain the plurality of locking elements 74 within the groove 40, while the locking ring formed by the plurality of locking elements 74 supports the valve assembly within the suction inlet bore 33 by preventing the collar 50 from rotating out of the bore 33 due to the high fluid pressures.

To remove and repair or replace the suction valve assembly, the manifold cover plate 101 and flow diverter 80 are removed from the suction manifold. The valve removal tool is inserted into the valve seat collar to slightly screw member 50 into the valve inlet bore. At this point locking elements 74 may be removed from groove 40 and are withdrawn. Valve assembly 51 can now be entirely removed by screwing valve seat collar 50 out of bore 33. A new or refurbished valve assembly can now be installed as described above.

Figure 7:
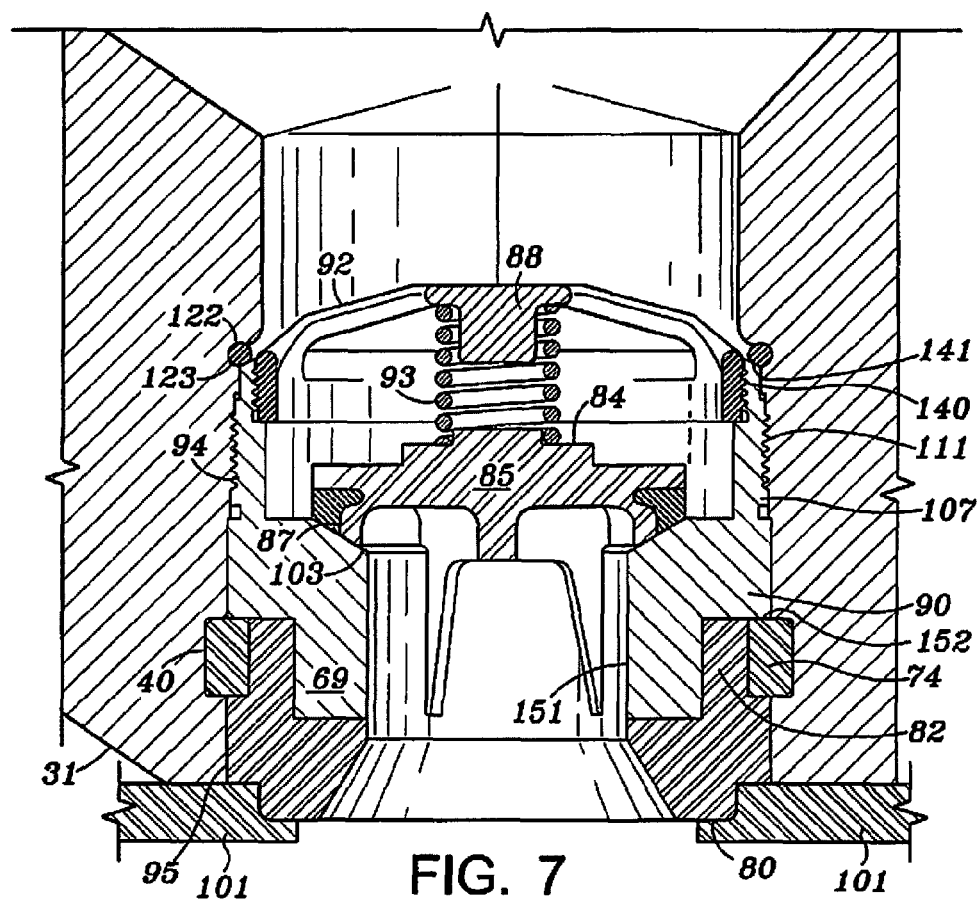
FIG. 7 is a cross sectional view of a "crows feet" valve assembly according to a second embodiment of the invention.

A second embodiment of the invention is illustrated in FIG. 7 wherein like components have the same reference member as the embodiment illustrated in FIGS. 3-6. Fluid end 31 includes suction inlet bore 95 having a recessed annular groove 40. A valve seat collar 151 in this embodiment includes an annular ridge 69, a main body 90, and an upper threaded portion 107. A valve member 85 has a lower portion 87 forming a valve face that cooperates with a frusto-conical valve seat surface 103 on an interior surface of valve seat collar 151.

A spring guide and support member 92 is threaded at 140 into upper threaded portion 107 of the valve seat collar 151. A spring 93 is supported between spring guide 88 and a shoulder 84 provided on the valve member 85 as shown in FIG. 7.

Valve seat collar 51 is externally threaded at 111 and cooperates with internal threads 94 provided in bore 95. An O-ring 122 is captured within a groove 123 in inlet bore 95 and abuts against a beveled end portion 141 of valve seat collar 51.

Before installing the valve assembly within the suction inlet bore 95, the spring guide and support member 92 is threaded into valve seat collar 151 to compress the spring 93 such that valve member 85 is biased against the valve seat collar 151. This valve assembly may then be placed within the bore. Once placed within the bore, the valve seat collar 151 is then threaded into the suction inlet bore 95 to a position where portion 90 clears groove 40, thereby exposing the full dimensions of the annular groove 40 for accepting a plurality of locking elements 74. This valve assembly may be provided as a single cartridge unit that is preassembled. Next, a plurality of locking elements 74 are positioned within the annular groove 40 as shown in FIG. 7 to further retain the valve assembly within the suction inlet bore 95. After the locking elements 74 are placed within the annular groove 40, the valve seat collar 151 is then backed slightly out of the bore 95 in order to seat the shoulder 152 against the locking elements 74, thereby imparting a compressive force on the locking elements 74 and the wall of the annular groove 40, which also reduces the shear load felt by the threads 111 due to the pump operating pressures. Next, the flow diverter 80 is positioned within the suction inlet bore 95 such that annular ridge 82 of the flow diverter 80 is positioned between the locking elements 74 and the annular ridge 69 of the valve seat collar 151, thereby effectively serving as a locking ring retainer. This arrangement prevents the locking segments from moving out of annular groove 40, while the locking ring formed by the plurality of locking elements 74 supports the valve assembly within the suction inlet bore 95 by preventing the valve seat collar 151 from rotating out of bore 95 due to the high fluid pressures. Flow diverter 80 is held in position by a suction manifold plate 101 that is bolted or otherwise secured to fluid end 31 as previously mentioned. Removal can be accomplished simply by reversing the installation process beginning with removal of the suction manifold plate 101, flow diverter 80, and the locking elements 74. The remaining valve assembly may they be removed from the suction inlet bore 95 as a unit.

Although the present invention has been described with respect to specific details, it is not intended that such details should be regarded as limitations on the scope of the invention, except to the extent that they are included in the accompanying claims.

I claim:

1. A valve assembly for a fluid end of a high pressure pump, the fluid end including at least one suction inlet bore into which the valve assembly is adapted to be placed, the valve assembly comprising:
    a threaded valve seat collar having a valve seat;
    a valve member extending within the threaded valve seat collar for reciprocal movement, the valve member having a valve face for engagement with the valve seat; and
    a locking ring adapted to be positioned in an annular groove provided in the suction inlet bore to support the valve assembly within the suction inlet bore.

2. The valve assembly according to claim 1 wherein the locking ring comprises a plurality of arcuate locking elements.

3. The valve assembly according to claim 1 further including a flow diverter.

4. The valve assembly according to claim 1 wherein the threaded valve seat collar further comprises:
    a valve stem guide having a shoulder thereon;
    a spring retaining member having a shoulder thereon, the spring retaining member secured to a valve stem; and
    a spring compressed between the spring retaining member shoulder and the valve stem guide shoulder.

5. The valve assembly according to claim 1 further comprising a spring guide and support member.

6. The valve assembly according to claim 5 further comprising a spring positioned between the spring guide and support member and the valve member.

7. The valve assembly according to claim 2 wherein the arcuate locking elements have edges that are beveled to facilitate movement of the arcuate locking elements into the annular groove provided in the suction inlet bore.

8. A fluid end for a high pressure pump comprising:
- a body member having at least one plunger bore, at least one suction inlet bore, and at least one outlet bore, the suction inlet bore having a threaded portion and an annular groove;
- a threaded valve seat collar having a valve seat and threadly engaged with the suction inlet bore threads;
- a valve member extending within the threaded valve seat collar for reciprocal movement, the valve member having a valve surface for engagement with the valve seat; and
- a locking ring positioned in the annular groove in the suction inlet bore and engaging a shoulder portion on the threaded valve seat collar to support the threaded valve seat collar within the suction inlet bore.

9. The fluid end for a high pressure pump according to claim 8 wherein the locking ring comprises a plurality of arcuate locking elements.

10. The fluid end for a high pressure pump as claimed in claim 8 further including a flow diverter located within the suction inlet bore upstream of the threaded valve seat collar.

11. The fluid end for a high pressure pump according to claim 8 wherein the threaded valve seat collar further comprises:
- a valve stem guide having a shoulder thereon;
- a spring retaining member having a shoulder thereon, the spring retaining member secured to a valve stem; and
- a spring compressed between the spring retaining member shoulder and the valve stem guide shoulder.

12. The fluid end for a high pressure pump according to claim 8 further comprising a spring guide and support member.

13. The fluid end for a high pressure pump according to claim 12 further comprising a spring positioned between the spring guide and support member and the valve member.

14. The fluid end for a high pressure pump according to claim 9 wherein the arcuate locking elements have edges that are beveled to facilitate insertion of the arcuate locking elements into the annular groove provided in the suction inlet bore.

15. A method of servicing a fluid end of a high pressure pump, the method steps comprising:
- in the fluid end having at least one suction inlet bore, the suction inlet bore having threads and an annular groove on an interior wall, removing a suction inlet valve as an assembly from the suction inlet bore.

16. The method of claim 15, the method steps further comprising:
- threading a valve as an assembly into the threaded portion of the suction inlet bore; and
- inserting a locking ring into the annular groove to support the valve assembly within the suction inlet bore.

17. The method of claim 16, wherein the locking ring comprises a plurality of arcuate locking elements.

* * * * *